US009783231B2

(12) United States Patent
Freistadt et al.

(10) Patent No.: US 9,783,231 B2
(45) Date of Patent: Oct. 10, 2017

(54) ORIENTATION OF THE EXTENT OF A VEHICLE IN THE DIRECTION OF THE ROADWAY IN A PARKED END POSITION WITH A PARKING ASSISTANCE SYSTEM FOR TRANSVERSE PARKING

(71) Applicant: Bayerische Motoren Werke Aktiengesellschaft, Munich (DE)

(72) Inventors: Alois Freistadt, Oberschleissheim (DE); Izden Sarihan, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/064,134

(22) Filed: Mar. 8, 2016

(65) Prior Publication Data

US 2016/0257343 A1 Sep. 8, 2016

(30) Foreign Application Priority Data

Mar. 8, 2015 (DE) .................. 10 2015 204 129

(51) Int. Cl.
*B62D 15/00* (2006.01)
*B62D 15/02* (2006.01)
*B60W 30/06* (2006.01)

(52) U.S. Cl.
CPC ......... *B62D 15/0285* (2013.01); *B60W 30/06* (2013.01); *B60W 2550/10* (2013.01); *B60W 2720/24* (2013.01)

(58) Field of Classification Search
CPC ........................... B60W 30/06; B62D 15/0285
See application file for complete search history.

(56) References Cited

U.S. PATENT DOCUMENTS

| 4,931,930 | A | * | 6/1990 | Shyu | .................. | B60Q 9/007 |
| | | | | | | 180/167 |
| 6,999,003 | B2 | | 2/2006 | Matsukawa et al. | | |
| 2005/0285758 | A1 | * | 12/2005 | Matsukawa | ........... | B60W 10/06 |
| | | | | | | 340/932.2 |
| 2014/0156148 | A1 | * | 6/2014 | Kikuchi | .............. | B62D 15/027 |
| | | | | | | 701/48 |

(Continued)

FOREIGN PATENT DOCUMENTS

| DE | 10 2010 032 462 A1 | 2/2012 |
| DE | 10 2011 086 215 A1 | 5/2013 |

OTHER PUBLICATIONS

German-language Office Action issued in counterpart German Application No. 10 2015 204 129.8 dated Dec. 21, 2015 (four (4) pages).

*Primary Examiner* — Michael Whalen
(74) *Attorney, Agent, or Firm* — Crowell & Moring LLP

(57) ABSTRACT

A parking assistance system is provided for carrying out an automated parking maneuver of a motor vehicle into a perpendicular parking space transversely with respect to the roadway along a parking trajectory to a parked end position. The parking assistance system is configured to determine an offset between the extent of one object in the direction of the roadway on one side of the parking space and the extent of another object in the direction of the roadway on the other side of the space by way of a sensor system. The parking assistance system is configured to determine a parking trajectory with a parked end position based on the offset.

13 Claims, 5 Drawing Sheets

(56) References Cited

U.S. PATENT DOCUMENTS

| | | | |
|---|---|---|---|
| 2015/0258988 A1* | 9/2015 | Morimoto | B62D 15/027 701/70 |
| 2016/0075326 A1* | 3/2016 | Kiyokawa | B60W 30/06 701/41 |
| 2016/0075375 A1* | 3/2016 | Yamashita | B62D 15/028 701/41 |
| 2016/0114795 A1* | 4/2016 | Kiyokawa | B60W 30/06 342/55 |

* cited by examiner

ORIENTATION OF THE EXTENT OF A VEHICLE IN THE DIRECTION OF THE ROADWAY IN A PARKED END POSITION WITH A PARKING ASSISTANCE SYSTEM FOR TRANSVERSE PARKING

CROSS REFERENCE TO RELATED APPLICATIONS

This application claims priority under 35 U.S.C. §119 from German Patent Application No. 10 2015 204 129.8, filed Mar. 8, 2015, the entire disclosure of which is herein expressly incorporated by reference.

BACKGROUND AND SUMMARY OF THE INVENTION

The invention relates to a parking assistance system and to a corresponding method for carrying out an automated parking maneuver into a perpendicular parking space transversely with respect to the roadway with at least automated lateral guidance for motor vehicles, in particular for passenger cars.

Known parking assistance systems with at least automated lateral guidance typically measure a parking space and its surroundings by use of an ultrasonic sensor system before carrying out the parking maneuver, and calculate, on the basis thereof, a parking trajectory with a parked end position as the target point of the parking trajectory. The vehicle is then steered into the parking space along the parking trajectory by the parking assistance system in one or more parking movements.

In the case of parking assistance systems with automated lateral guidance, the steering of the motor vehicle is taken over by the system during the parking process. The longitudinal guidance has to be performed by the driver himself by corresponding acceleration and braking. In the case of parking assistance systems with automated lateral guidance and automated longitudinal guidance, the task of the longitudinal guidance is also partially or completely performed by the parking assistance system depending on the degree of automation of the longitudinal guidance. It is possible, for example, for the steering, the brake, the vehicle drive and the direction of travel (forward travel or reverse travel) to be controlled by the parking assistance system. In such parking assistance systems, the driver has, for example, the possibility of being able to allow the vehicle to be parked automatically and optionally moved out of the parking space by activating an operator control element, for example a pushbutton key.

Known parking assistance systems typically assist the reverse parking along the roadway into a parallel parking space which is located parallel to the roadway, wherein the vehicle is parked in a rearward direction into the parallel parking space with automated lateral guidance and, if appropriate, automated longitudinal guidance along a calculated parking trajectory in one or more movements.

Relatively new parking assistance systems partially also additionally assist the rearward parking into a perpendicular parking space transversely with respect to the roadway, wherein the vehicle is preferably parked in a rearward direction into the perpendicular parking space with automated lateral guidance and, if appropriate, automated longitudinal guidance along a calculated parking trajectory in one or more movements. Perpendicular parking spaces can also be referred to as so-called oblique parking spaces which are not oriented orthogonally with respect to the roadway.

The perpendicular parking spaces which are assisted by the parking assistance systems are typically bounded by a lateral object on the one side of the perpendicular parking space and another lateral object on the other side of the perpendicular parking space. The objects which bound the parking space are generally parked motor vehicles which have been parked transversely with respect to the roadway. Such an object which bounds the parking space laterally can, however, also be an object which is not a vehicle, such as for example a pillar, a bollard, railings or low ground-level structures such as planter boxes.

In general, one of the two objects which bound the parking space extends at least somewhat further in the direction of the roadway than the other object.

When the parking trajectory in known parking assistance systems for automated parking into a perpendicular parking space is determined, such a parked end position is frequently aimed at as a target of the parking trajectory with which the extent of the vehicle is oriented in the direction of the roadway in the parked end position toward the extent of that object of the two objects in the direction of the roadway which extends less far in the direction of the roadway. That is to say the parking assistance system is oriented with the object whose boundary is offset further toward the rear with respect to the roadway and correspondingly projects less in the direction of the roadway. The intention here is to maneuver the vehicle as far as possible into the perpendicular parking space.

If the object which extends less far in the direction of the roadway and at which the parking assistance system orients itself for the longitudinal extent in the parked end position is an object which is significantly shorter compared to the parking vehicle (for example a significantly shorter vehicle, a column or a planter box), it is possible that after the ending of the parking process the parking vehicle is located far to the rear in the parking space to the extent that it is implausible to the driver, and, under certain circumstances, already projects over a curbstone which bounds the parking space to the rear and lies behind it, or the rear wheels of the vehicle have even driven onto the curbstone. If the parking space is bounded to the rear by a relatively high object, such as for example, a relatively high curbstone or a fence, which is detected by the ultrasonic sensor system of the parking vehicle during the parking process, the parking process can be aborted prematurely by the parking assistance system with a corresponding message before the parked end position is reached.

The object of the invention is to provide a parking assistance system and a corresponding method for carrying out an automated parking maneuver into a perpendicular parking space, which system and method overcome the disadvantages mentioned above.

This and other objects are achieved in accordance with embodiments of the invention.

One aspect of the invention relates, to a parking assistance system for carrying out an automated parking maneuver of a motor vehicle into a perpendicular parking space transversely with respect to the roadway to a parked end position along a parking trajectory, wherein the perpendicular parking space is bounded by a lateral object on the one side of the perpendicular parking space and another lateral object on the other side of the perpendicular parking space. The parking maneuver is preferably a parking maneuver in the rearward direction in one or more parking movements. The parking assistance system has at least one automated lateral guidance system.

The parking assistance system can also have an automated longitudinal guidance system as described above.

The parking assistance system is configured to determine an offset between the extent of the one object in the direction of the roadway and the extent of the other object in the direction of the roadway by way of a sensor system (in particular, by use of an ultrasonic sensor system with at least one ultrasonic sensor which is arranged laterally on the vehicle). When the vehicle drives past the parking space, a map of the surroundings in which the boundaries of the objects which bound the parking space in the direction of the roadway are entered is generated, for example, on the basis of the distances from the objects measured by ultrasonic sound. The offset of the two objects in the direction of the roadway can be determined therefrom. For example, the parking assistance system measures an offset of 0.4 m or 0.8 m in the direction of the roadway between the objects bounding the parking space laterally.

The parking assistance system is configured to determine a parking trajectory with a parked end position on the basis of the offset.

Insofar as, to be precise, a relatively large offset (for example greater than or greater than or equal to a threshold value of, for example, approximately 0.5 m) is present, a parking trajectory with a parked end position is determined wherein, in the planned parked end position of the parking trajectory, the extent of the vehicle in the direction of the roadway is oriented toward the extent of that object of the two objects which extends further in the direction of the roadway. This means that the parking assistance system is oriented toward the object for defining the parked end position whose boundary is offset less far toward the rear with respect to the roadway and correspondingly projects more in the direction of the roadway. It is not absolutely necessary for the extent of the vehicle to be adjusted precisely toward the extent of that object of the two objects which extends further in the direction of the roadway; instead the vehicle can, for example, also be adjusted several centimeters further in the direction of the roadway compared to the extent of the object which extends further in the direction of the roadway.

In an alternative embodiment, in the planned end position the extent of the vehicle in the direction of the roadway is not oriented toward the extent of the object which extends further in the direction of the roadway, but instead orientation is made out only toward an intermediate value between the extent of the one object in the direction of the roadway and the extent of the other object in the direction of the roadway. For example, the extent in the planned parked end position is oriented toward 80% of the offset between the objects, i.e. the boundary of the vehicle in the parked end position is significantly closer in the direction of the roadway to the boundary of the vehicle which extends further in the direction of the roadway than at the boundary of the vehicle which extends less far in the direction of the roadway. However, in this context, it is important for the invention that, insofar as orientation is also made toward an intermediate value of the two extents in the second case discussed further below—the intermediate value in the first case is adjusted, relative to the offset (i.e. in percentage terms in relation to the respective offset and not necessarily in terms of absolute meter data) closer to the extent of the object extending further in the direction of the roadway than in a second case. For example, this would be the case in the abovementioned numerical example if in the second case the extent in the planned parked end position were oriented toward 50% (compared to 80%) of the offset between the objects, i.e. the boundary of the vehicle in the direction of the roadway in the parked end position is located at the halfway point between the extent in the direction of the roadway.

Insofar as a smaller offset is present in the second case in comparison with the first case (for example smaller than a threshold value of, for example, 0.5 m), a parking trajectory with a parked end position is determined such that in the planned parked end position the extent of the vehicle is oriented in the direction of the roadway toward an intermediate value between the extent of the one object in the direction of the roadway and the extent of the other object in the direction of the roadway (for example toward 50% of the offset as discussed above). In an alternative embodiment, in the second case a parking trajectory with a parked end position with an offset which is relatively small compared to the first case could be determined such that in the parked end position the extent of the vehicle is oriented toward the extent of that object of the two objects which extends less far in the direction of the roadway. It is not actually necessary for the extent of the vehicle to be adjusted precisely toward the extent of that object of the two objects which extends less far in the direction of the roadway; instead, the vehicle can, for example, also be adjusted several centimeters further counter to the direction of the roadway compared to the extent of the object which extends less far in the direction of the roadway.

The invention is based on the concept that in the case of a relatively large offset of the two objects there is a very high probability that the object which extends less far in the direction of the roadway is not a parked vehicle, but instead an object which is not a vehicle and which projects less far into the roadway or a vehicle which is relatively short compared to the driver's own vehicle. In this case, it makes no sense for the extent of the driver's own vehicle in the parked end position to be oriented toward the extent of this object, since otherwise after the ending of the parking process the parking vehicle will be located too far to the rear in the parking space, or the parking process will even be aborted previously because of an obstacle. In this case, the vehicle will instead be adjusted in terms of its extent in the parked end position to the extent of the object which extends further in the direction of the roadway.

It is alternatively also contemplated that in this case the extent of the vehicle in the direction of the roadway is oriented at least toward an intermediate value between the extent of the two objects in the direction of the roadway, wherein the intermediate value is adjusted, relative to the offset, closer to the extent of the object which extends further in the direction of the roadway than when a relatively short offset is present. In this case, the vehicle is therefore parked less far toward the rear for a relatively large offset than if no differentiation is made with respect to the offset. For example, in the case of a relatively large offset (for example 1.0 m), the extent of the vehicle in the parked end position is oriented toward 80% of the offset between the objects (for example in absolute numbers toward 0.8 m measured in the direction of the roadway from the object which extends less far into the roadway), while in the case of a relatively small offset (for example 0.2 m) the extent of the vehicle in the parked end position is oriented toward 50% of the offset which is then present (for example in absolute numbers toward 0.1 m measured in the direction of the roadway from the object which extends less far into the roadway) between the objects, or is even oriented toward the extent of the object which extends less far in the direction of the roadway.

The approach according to the invention makes it possible to prevent a situation in which, after the parking process has been carried out, the driver's own vehicle is located too far into the parking space and, under certain circumstances, is located over the curbstone located behind it, and therefore projects onto the curbstone. Furthermore, it is possible to ensure that the driver's own vehicle assumes a parked end position which is plausible to the driver.

It is to be noted that there may be four different possible ways of implementing the parking assistance system according to the invention: two different OR alternatives with respect to the presence of a relatively large offset and two different OR alternatives with respect to the presence of a relatively small offset. If these alternatives are combined with one another, four different combinations result.

One preferred embodiment corresponds to one of these four combinations: insofar as a relatively large offset is present in the first case, in the parked end position the extent of the vehicle in the direction of the roadway is oriented toward the extent of that object of the two objects which extends further in the direction of the roadway, whereas insofar as an offset which is smaller compared to the first case is present in the second case, in the parked end position the extent of the vehicle in the direction of the roadway is oriented toward an intermediate value between the extent of the two objects in the direction of the roadway (for example centrally between the two extents to half of the offset).

It is also to be noted that orientation of the extent toward an intermediate value does not necessarily mean that the intermediate value corresponds to a fraction of the offset which is fixed relative to the offset (i.e. a fixed percentage of the offset). For example, the extent can be oriented toward an intermediate value of the extent of the two objects in that the extent of the object which extends further in the direction of the roadway plus a fixed absolute offset (for example 10 cm) counter to the direction of the roadway is used as an orientation aid (or alternatively the extent of the object which extends less far in the direction of the roadway plus a fixed absolute offset in the direction of the roadway is used).

However, in the first and/or in the second case, the intermediate value is preferably respectively a fixed fraction relative to the offset (i.e. a fixed percentage of the offset). For example, in the second case the fraction corresponds to half the offset as a fixed percentage of the offset.

It is advantageous if the parking assistance system is configured to carry out a threshold value comparison with a threshold value for the offset, in order to check whether the first or the second case is present. The first case corresponds to the situation in which the specific offset is greater than or greater than or equal to the threshold value, whereas the second case corresponds to the situation in which the specific offset is less than or equal to or less than the threshold value.

For example, in the case of an offset up to a certain threshold value (0.5 m) for the offset, the driver's own vehicle is oriented centrally (i.e. half offset) between the extent in the direction of the roadway of the one object and the extent in the direction of the roadway of the other object. When there is an offset that is larger than the threshold value, the vehicle is oriented, with respect to the extent of the direction of the roadway, toward the object which extends further in the direction of the roadway (i.e. which projects further into the roadway).

The threshold value is preferably in the range between 0.2 m and 1.0 m; the threshold value corresponds, for example, to approximately 0.5 m.

It is also contemplated to provide, instead of a threshold value, a functional relationship of whatever type between the offset and the positioning of the extent of the vehicle in the direction of the roadway, for example a linear relationship between the offset and the positioning of the vehicle could also be used.

A second aspect of the invention relates to a method for carrying out an automated parking maneuver of a motor vehicle into a perpendicular parking space transversely with respect to the roadway, wherein the perpendicular parking space is bounded by a lateral object on the one side of the perpendicular parking space and by another lateral object on the other side of the perpendicular parking space. An offset between the extent of the one object in the direction of the roadway and the extent of the other object in the direction of the roadway is determined by way of a sensor system. A parking trajectory with a parked end position is determined on the basis of the offset, wherein—insofar as a relatively large offset is present in a first case—in the parked end position the extent of the vehicle in the direction of the roadway is oriented toward the extent of that object of the two objects which extends further in the direction of the roadway. Alternatively—insofar as a relatively large offset is present in a first case—in the parked end position the extent of the vehicle in the direction of the roadway is oriented at least toward an intermediate value between the extent of the one object in the direction of the roadway and the extent of the other object in the direction of the roadway, wherein—insofar as in a second case orientation is also made toward an intermediate value of the extent of both objects—the intermediate value in the first case is, relative to the offset, closer to the extent of the object extending further in the direction of the roadway than in a second case.

Insofar as in the second case, a smaller offset is present in comparison with the first case, in the parked end position the extent of the vehicle is oriented in the direction of the roadway toward an intermediate value between the extent of the one object in the direction of the roadway and the extent of the other object in the direction of the roadway. Alternatively, in the second case it would also be possible that in the parked end position of the trajectory the extent of the vehicle is oriented toward the extent of that object of the two objects which extends less far in the direction of the roadway.

The above statements relating to the parking assistance system according to the invention in accordance with the aspect of the invention first described apply in a corresponding way also to the method according to the invention according to the second aspect of the invention. At this point, advantageous exemplary embodiments of the method according to the invention which are not described explicitly correspond to the advantageous exemplary embodiments of the parking assistance system according to the invention which are described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
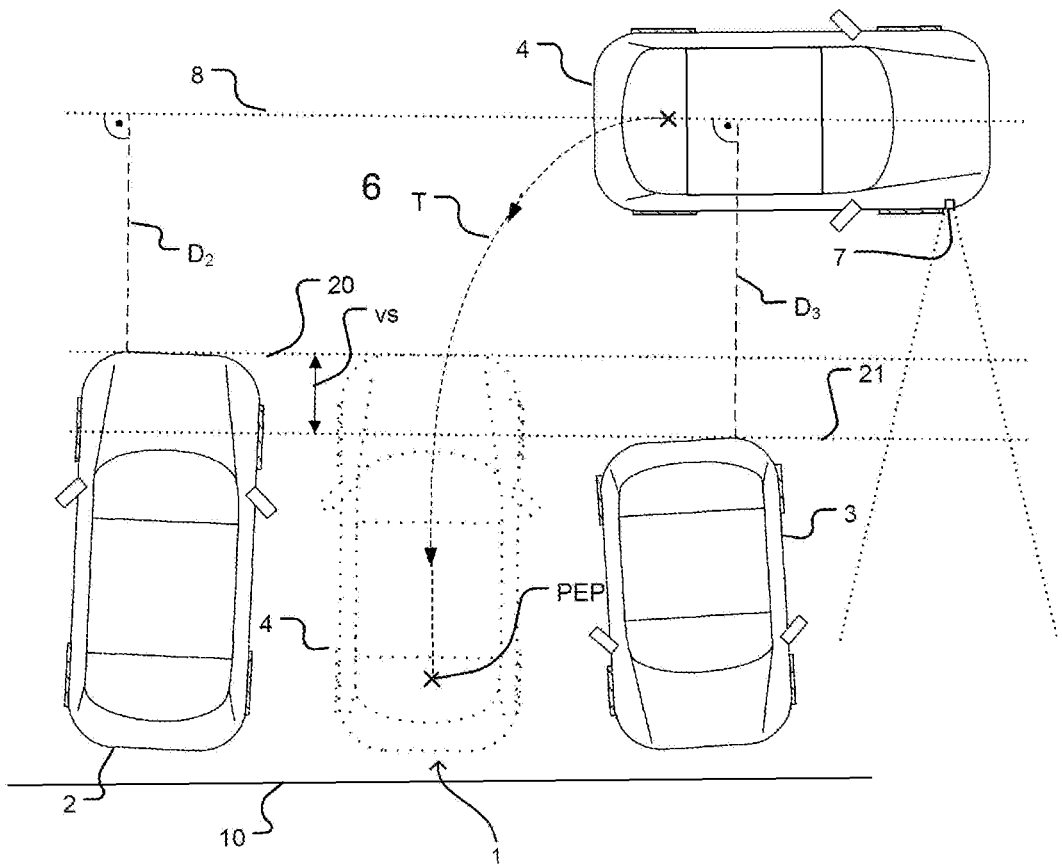
FIG. 1 is a schematic diagram showing a parking situation with a relatively large offset in a first exemplary embodiment of the parking assistance system.

FIG. 1 shows a parking situation in a perpendicular parking space 1 before the start of the parking process in a first exemplary embodiment of the parking assistance system according to the invention with automated lateral guidance and without automated longitudinal guidance. The exemplary embodiment could, however, also be expanded with additional longitudinal guidance.

Figure 2:
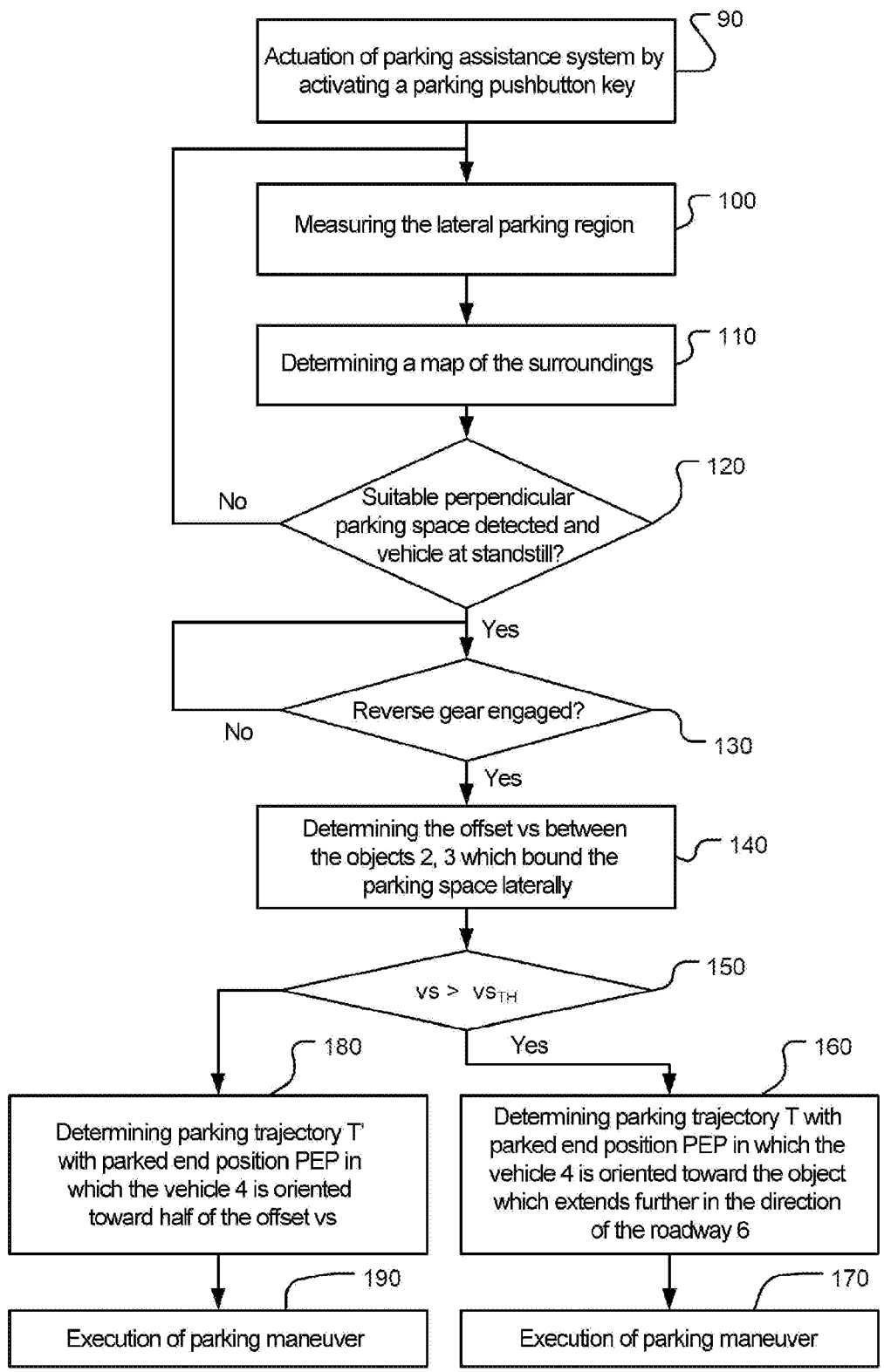
FIG. 2 is a flowchart of the first exemplary embodiment of the parking assistance system.
Figure 3:
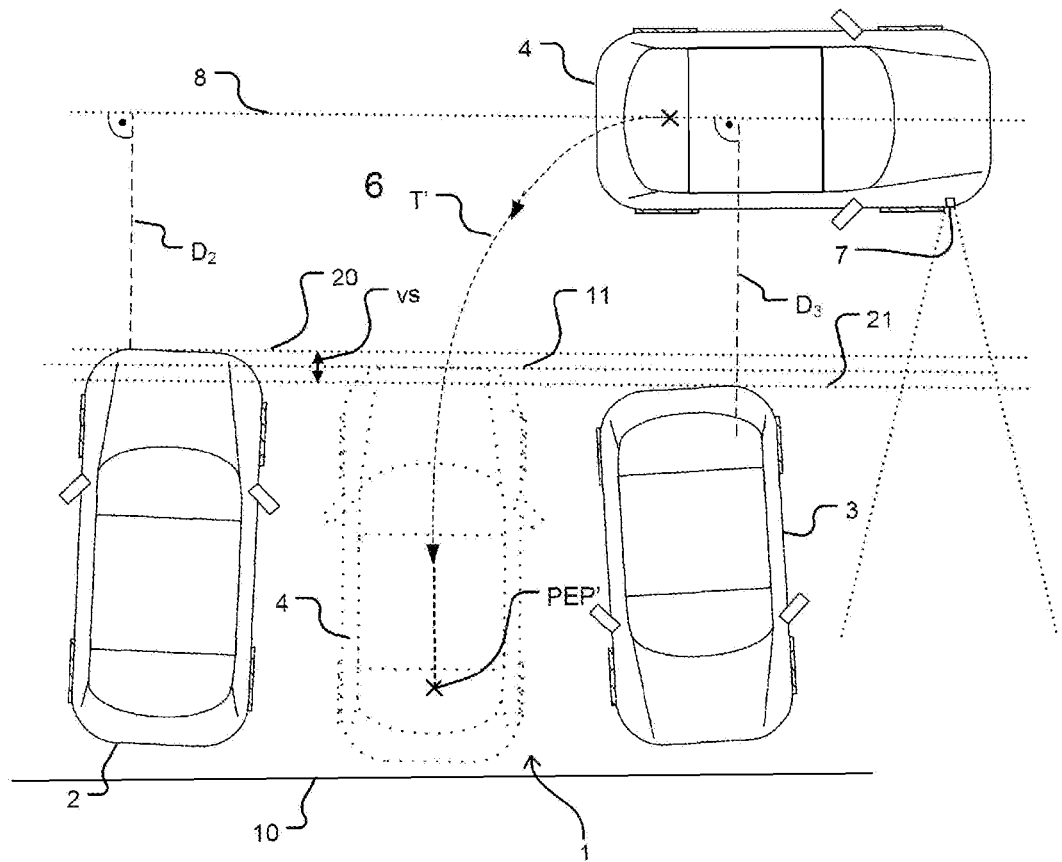
FIG. 3 is a schematic diagram showing a parking situation with a relatively small offset in the first exemplary embodiment of the parking assistance system.

FIG. 2 shows a flowchart of the first exemplary embodiment of the parking assistance system on the basis of which the function of the first exemplary embodiment in conjunction with FIG. 1 and FIG. 3 is explained.

In step 90, the parking assistance system is activated by activation of a parking pushbutton key by the driver. After the parking assistance system has been switched on, the current status of the parking space search is displayed on a screen of the instrument cluster in the vehicle compartment.

As the motor vehicle in question drives slowly past the passenger cars 2, 3 which are parked transversely with respect to the roadway 6, the lateral parking area, in particular the perpendicular parking space 1 and the objects (here the vehicles 2 and 3) which bound the parking space 1 laterally are measured continuously by way of a lateral ultrasonic sensor 7 (see step 100 in FIG. 2). In this context, as the vehicle in question travels past, the respective distance between the ultrasonic sensor 7 and the closest object in the lateral direction is determined at the individual vehicle positions.

On the basis of the distance values measured by ultrasonic sound, in step 110 a map of the surroundings is generated in which the boundary contours of the objects in the direction of the roadway 6 of the objects bounding the parking space (here the vehicles 2 and 3) are entered. The range of the ultrasonic sensor 7 is typically limited to approximately 4 m; precise measurement of the rearmost region of the parking space 1, in particular the detection of a curbstone 10 which bounds the parking space toward the rear is therefore frequently not possible.

As long as the vehicle has not yet come to a standstill (see interrogation 120 in FIG. 2), as the vehicle in question drives past the measurement is carried on continuously and the map of the surroundings is continuously adapted to the new measured values.

Insofar as the perpendicular parking space 1 has been detected as a suitable perpendicular parking space, a pictogram of a detected perpendicular parking space is displayed on the screen. In order to detect a suitable perpendicular parking space, it is checked, for example, whether the parking space has a width between two objects which corresponds to the width of the vehicle in question plus at least 0.7 m, and within the scope of the measurement of the parking space no object is detected in the parking space transversely with respect to the roadway within the range of the sensor system (for example approximately 4 m).

Insofar as the perpendicular parking space 1 has been recognized as a suitable perpendicular parking space and the vehicle has come to a standstill (see interrogation 120), depending on the embodiment, the offset (vs in FIG. 1) between the respective extent of the two objects which bound the perpendicular parking space (here the motor vehicles 2, 3) in the direction of the roadway are determined on the basis of the map of the surroundings (see step 140) before or after the engagement of the reverse gear (see interrogation 130). The extent of the motor vehicle 2 in the direction of the roadway 6 is marked in FIG. 1 by the line 20; the extent of the motor vehicle 3 in the direction of the roadway 6 is marked by the line 21 in FIG. 1.

In order to determine the offset, for example a minimum distance D2 between a middle driving-past direction 8 of the vehicle 4 contained in the map of the surroundings and the contour of the object 2 toward the roadway and a minimum distance D3 between the middle driving-past direction 8 of the vehicle 4 contained in the map of the surroundings and the contour of the object 3 toward the roadway are determined. Exemplary minimum distances D2 and D3 are illustrated in FIG. 1. The offset vs is then obtained, for example, from the absolute value of the difference between the two minimum distances D2 and D2: vs=|D3−D2|.

In the interrogation 150, the offset vs is compared with a threshold value $vs_{TH}$ (for example vs=0.5 m).

Insofar as the offset value vs is larger than the threshold value $vs_{TH}$, a parking trajectory T with a planned parked end position PEP is calculated (see step 160), on which parking trajectory T the driver's own vehicle 4 is to park in the perpendicular parking space 1 in the rearward direction with automated lateral guidance in one or more movements. The parking trajectory T and the parked end position PEP are related to a specific reference point of the vehicle 4, for example to the center of the rear axle of the driver's own motor vehicle 4. Insofar as the offset value vs is larger than the threshold value $vs_{TH}$, the planned parked end position PEP of the parking trajectory T is selected in such a way that in the planned parked end position PEP the extent of the vehicle 4 in the direction of the roadway 6 is oriented toward the extent of that object (vehicle 2 in the example in FIG. 1) of the two objects 2, 3 which bound the parking space 1 which extends further in the direction of the roadway 6. A corresponding exemplary single-movement parking trajectory with a suitable parked end position PEP is illustrated in FIG. 1. The resulting contour of the vehicle 4 in the planned parked end position PEP is illustrated by dotted lines in FIG. 1.

After the parking trajectory T has been determined, the parking maneuver takes place (see step 170): the driver receives corresponding instructions relating to the longitudinal guidance of the vehicle 4, and the vehicle 4 is steered automatically on the basis of the calculated parking trajectory T. Just before the parked end position PEP is reached with the reference point of the vehicle 4 (here: the center of the rear axle) the driver receives the instruction to stop the vehicle 4. After the vehicle 4 has been stopped, the parking maneuver is then ended. Alternatively, the longitudinal guidance could also take place automatically. When the vehicle enters the parking space, slight corrections in respect of the rotation of the vehicle in the parked end position PEP can still be made as a function of the orientation of the two objects 2, 3 which can then be detected better by a sensor.

Insofar as the offset value vs is smaller than or equal to the threshold value $vs_{TH}$, a parking trajectory T' which is changed compared to the parking trajectory T and which has a different planned parked end position PEP' is calculated (see step 180), on which parking trajectory T' the driver's own vehicle 4 is to park in the perpendicular parking space 1 in the rearward direction with automated lateral guidance in one or more movements. In the planned parked end position PEP', the extent of the vehicle 1 in the direction of the roadway is oriented toward half the offset vs of the extent of the two objects 2, 3.

FIG. 3 illustrates an exemplary single-movement parking trajectory T' with a planned parked end position PEP' in which the vehicle 1 is oriented toward half of the offset vs. The line 11 marks half of the offset vs. The extent of the vehicle 1 in the direction of the roadway 6 is oriented toward this line 11 in the parked end position PEP'.

A second exemplary embodiment of a parking assistance system according to the invention will be discussed below with respect to FIG. 4 and FIG. 5.

Figure 4:
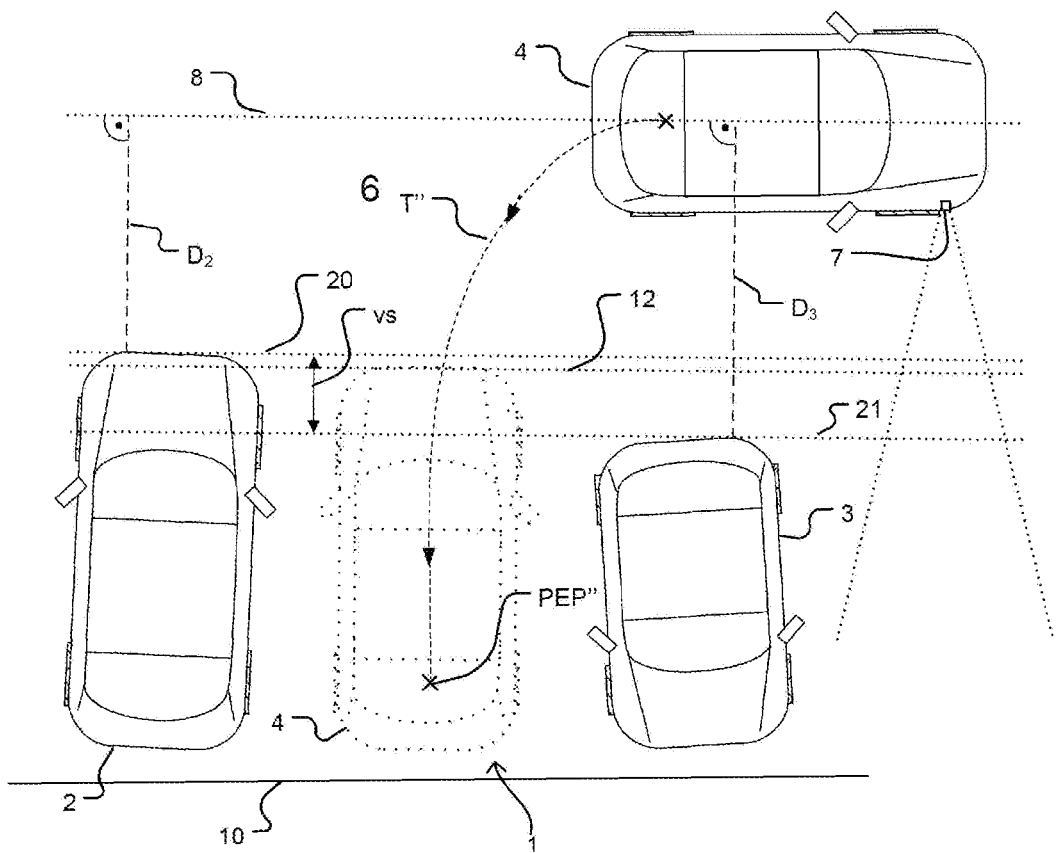
FIG. 4 is a schematic diagram showing a parking situation with a relatively large offset in a second exemplary embodiment of the parking assistance system.

FIG. 4 shows a parking situation in a perpendicular parking space 1 before the start of the parking process in the second exemplary embodiment of the parking assistance system according to the invention with automated lateral guidance (and without automated longitudinal guidance). The perpendicular parking space 1 corresponds to the perpendicular parking space in FIG. 1.

Figure 5:
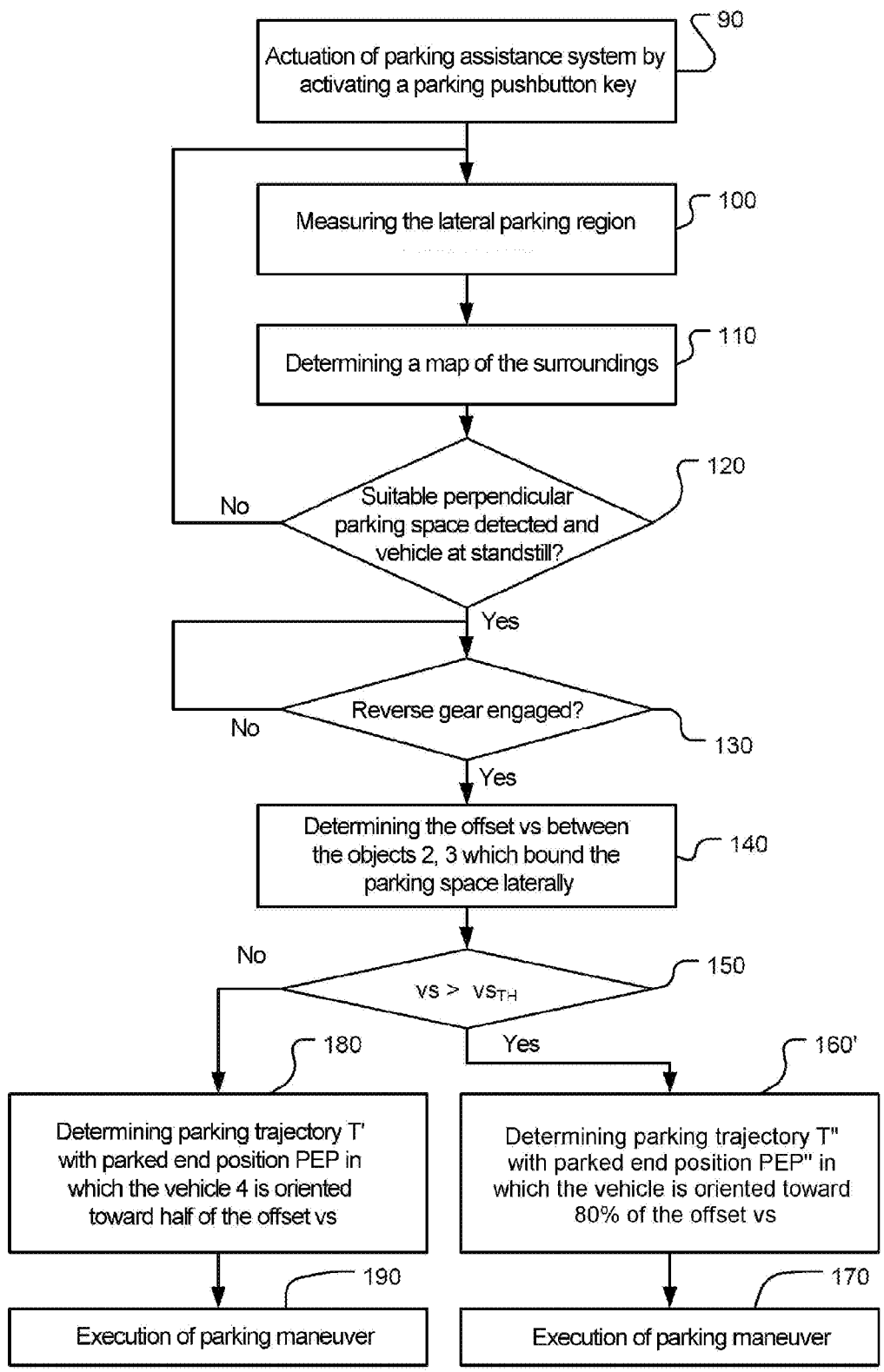
FIG. 5 is a flowchart of the second exemplary embodiment of the parking assistance system.

In FIG. 5, a flowchart of the second exemplary embodiment of the parking assistance system is shown, on the basis of which flowchart the method of functioning of the second exemplary embodiment of the parking assistance system is explained in conjunction with FIG. 4.

The method of functioning of the second exemplary embodiment according to FIG. 5 differs from the method of functioning of the first exemplary embodiment according to FIG. 2 in that in the event of the offset vs being larger than the threshold value $vs_{TH}$, a parking trajectory T" with a parked end position PEP" is determined, wherein in the planned parked end position PEP" the extent of the vehicle 1 in the direction of the roadway 6 is oriented toward 80% of the offset vs (see step 160'). The resulting parked end position PEP" is illustrated in FIG. 5. The line 12 marks 80% of the offset vs.

In the event of the offset vs being smaller than or equal to the threshold value $vs_{TH}$, the vehicle is oriented toward half of the offset vs, as in the first exemplary embodiment (see step 180 and FIG. 3).

From the comparison of FIG. 3 and FIG. 4 it is apparent that the fraction of 80% of the offset value vs toward which the orientation for vs larger than $vs_{TH}$ is carried out (see the line 12 in FIG. 4), is oriented closer, relative to the offset vs, to the line 20 of the extent of the vehicle 2 which extends further in the direction of the roadway 6 than half the offset vs toward which the orientation for vs smaller than or equal to vsTH occurs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

It is to be noted that additional features of a patent claim which is dependent on an independent patent claim can form, without the features of the independent patent claim or only in combination with a subset of the features of the independent patent claim, a separate invention which is independent of the combination of all the features of the independent patent claim and which can be made into the subject matter of an independent claim or of a divisional application.

What is claimed is:

1. A parking assistance system for carrying out an automated parking maneuver of a motor vehicle into a perpendicular parking space transversely with respect to the roadway, wherein the perpendicular parking space is bounded by a lateral object on one side of the perpendicular parking space and another lateral object on another side of the perpendicular parking space, with at least automated lateral guidance along a parking trajectory, which parking assistance system is configured to:
   (i) determine, via a sensor system, at least one offset between an extent of the lateral object in the direction of the roadway and an extent of the another lateral object in the direction of the roadway,
   (ii) determine a parking trajectory with a parked end position based on the at least one offset, wherein:
      (a) insofar as a first offset is present in a first case, in a planned parked end position the extent of the vehicle in the direction of the roadway
         is oriented essentially toward the extent of that lateral object of the two lateral objects which extends further in the direction of the roadway, or
         is oriented toward a first intermediate value between the extent of the lateral object in the direction of the roadway and the extent of the another lateral object in the direction of the roadway, and
      (b) insofar as a second offset is present in a second case that is smaller than the first offset of the first case, in the planned parked end position the extent of the vehicle in the direction of the roadway
         is oriented toward a second intermediate value between the extent of the lateral object in the direction of the roadway and the extent of the another lateral object in the direction of the roadway, wherein the first intermediate value in the first case is closer to the extent of that lateral object of the two lateral objects extending further in the direction of the roadway than the second intermediate value in the second case, or
         is oriented essentially toward the extent of that lateral object of the two lateral objects which extends less far in the direction of the roadway.

2. The parking assistance system according to claim 1, wherein:
   insofar as the first offset is present in the first case, in the parked end position the extent of the vehicle in the direction of the roadway is oriented essentially toward the extent of that lateral object of the two lateral objects which extends further in the direction of the roadway, and
   insofar as the second offset which is smaller compared to the first case is present in the second case, in the parked end position the extent of the vehicle in the direction of the roadway is oriented toward an intermediate value between the extent of the lateral object in the direction of the roadway and the extent of the another lateral object in the direction of the roadway.

3. The parking assistance system according to claim 1, wherein the first and second intermediate values correspond to a fixed fraction of the at least one offset in each case.

4. The parking assistance system according to claim 3, wherein in the second case the fraction corresponds to half the at least one offset.

5. The parking assistance system according to claim 1, wherein:
   the parking assistance system is configured to carry out a threshold value comparison with a threshold value for the at least one offset, the first case corresponds to a situation in which the first offset is greater than or greater than or equal to the threshold value, and the second case corresponds to the situation in which the second offset is less than or equal to or less than the threshold value.

6. The parking assistance system according to claim 1, wherein the parking assistance system is configured to:
determine a measure which is characteristic of the extent of the lateral object and a measure which is characteristic of the extent of the another lateral object, and
determine the at least one offset on the basis thereof.

7. The parking assistance system according to claim 1, wherein the extent of the lateral object in the direction of the roadway and the extent of the another later object in the direction of the roadway are: i) smaller than an overall length of the lateral object, and ii) smaller than an overall length of the another lateral object, respectively.

8. The parking assistance system according to claim 1, wherein the extent of the lateral object in the direction of the roadway and the extent of the another later object in the direction of the roadway correspond to: i) a distance between a point on the lateral object closest to the roadway and a point on the roadway, and ii) a distance between a point on the another lateral object closest to the roadway and the point on the roadway, respectively.

9. A method for carrying out an automated parking maneuver of a motor vehicle into a perpendicular parking space transversely with respect to a roadway, wherein the perpendicular parking space is bounded by a lateral object on one side of the perpendicular parking space and by another lateral object on another side of the perpendicular parking space, with at least automated lateral guidance along a parking trajectory, wherein the method comprises the acts of:

(i) determining, via a sensor system, at least one offset between an extent of the lateral object in the direction of the roadway and the extent of the another lateral object in the direction of the roadway, (ii) determining a parking trajectory with a parked end position based on the at least one offset, wherein (a) insofar as a first offset is present in a first case, in a planned parked end position the extent of the vehicle in the direction of the roadway
is oriented essentially toward the extent of that lateral object of the two lateral objects which extends further in the direction of the roadway, or
is oriented at least toward a first intermediate value between the extent of the lateral object in the direction of the roadway and the extent of the another lateral object in the direction of the roadway, and (b) insofar as a second offset is present in a second case that is smaller than the first offset of the first case, in the planned parked end position the extent of the vehicle in the direction of the roadway
is oriented toward a second intermediate value between the extent of the lateral object in the direction of the roadway and the extent of the another lateral object in the direction of the roadway, wherein the first intermediate value in the first case is closer to the extent of that lateral object of the two lateral objects extending further in the direction of the roadway than the second intermediate value in the second case, or
is oriented essentially toward the extent of that lateral object of the two lateral objects which extends less far in the direction of the roadway.

10. The method according to claim 9, wherein the extent of the lateral object in the direction of the roadway and the extent of the another later object in the direction of the roadway are: i) smaller than an overall length of the lateral object, and ii) smaller than an overall length of the another lateral object, respectively.

11. The method according to claim 9, wherein the extent of the lateral object in the direction of the roadway and the extent of the another later object in the direction of the roadway correspond to: i) a distance between a point on the lateral object closest to the roadway and a point on the roadway, and ii) a distance between a point on the another lateral object closest to the roadway and the point on the roadway, respectively.

12. A parking assistance system for carrying out an automated parking maneuver, the system comprising:
a motor vehicle;
at least one sensor operatively configured in the motor vehicle; and
an electronic control unit that receives signals from the at least one sensor, the electronic control unit maneuvering the motor vehicle into a perpendicular parking space transversely with respect to the roadway, the perpendicular parking space being bounded by a first lateral object on one side of the perpendicular parking space and a second lateral object on another side of the perpendicular parking space, wherein the electronic control unit:
using the at least one sensor, determines: i) a first offset that corresponds to a first reference distance between an end of the first lateral object and a reference point on the roadway, and ii) a second offset that corresponds to a second reference distance between an end of the second lateral object and the reference point on the roadway,
calculates an observed offset by taking the absolute value of the difference between the first offset and the second offset,
carries out a threshold comparison, in which the observed offset is compared to a threshold offset value that is stored in the electronic control unit, and
outputs a command that instructs the motor vehicle to move into a first end parking position based on the outcome of the threshold comparison.

13. The system according to claim 12, wherein
if a result of the threshold comparison is that the observed offset is greater than the threshold offset, the electronic control unit sets the first end parking position such that a distance between one end of the motor vehicle and the reference point on the roadway is the same as a smaller of the first reference distance and the second reference distance, and
if a result of the threshold comparison is that the observed offset is smaller than the threshold offset, the electronic control unit sets the first end parking position such that a distance between the one end of the motor vehicle and the reference point on the roadway is halfway between the first reference distance and the second reference distance.

* * * * *